United States Patent

Hirt

[15] 3,652,045
[45] Mar. 28, 1972

[54] PIPE HANGER

[72] Inventor: Andrew J. Hirt, Youngstown, Ohio

[73] Assignee: Hanger Supply Company, Youngstown, Ohio

[22] Filed: Mar. 13, 1970

[21] Appl. No.: 19,415

[52] U.S. Cl.............................................248/62, 287/100
[51] Int. Cl.......................................................F16l 3/00
[58] Field of Search....................248/62, 59, 58, 74, 63; 287/100

[56] References Cited

UNITED STATES PATENTS

| | | | |
|---|---|---|---|
| 251,464 | 12/1881 | Rogers | 287/100 X |
| 706,903 | 8/1902 | Crawford | 248/62 |
| 1,222,997 | 4/1917 | Rottmer | 287/100 X |
| 2,484,759 | 10/1949 | Starr | 287/100 |
| 2,714,497 | 8/1955 | Denis | 248/62 |
| 3,162,112 | 12/1964 | Wheeler | 248/62 X |

Primary Examiner—Chancellor E. Harris
Attorney—Peter L. Klempay

[57] ABSTRACT

A pipe hanger having a U-shaped saddle member and a supporting yoke. The upper ends of the arms of the saddle member are received between the downwardly projecting end portions of the yoke and are retained in place by a rod passing through holes in the downwardly projecting yoke ends and in the upper ends of the arms of the saddle. One end of the rod is bent at right angles to provide a handle for turning the rod. The holes in the yoke and saddle are provided with notches and the rod has raised portions aligned on one side which pass through the notches when the rod is aligned in one direction and which are retained by the holes when the rod is rotated out of alignment. The raised portion of the rod furthest from the bent end is longer than the other raised portions and the notch of the hole in the saddle adjacent the bent end of the rod is smaller than the other notches so that the last mentioned raised portion does not pass therethrough. Raised portions are provided on the rod for keeping the upper ends of the saddle from moving inwardly under load.

13 Claims, 16 Drawing Figures

PATENTED MAR 28 1972

INVENTOR.
ANDREW J. HIRT
BY
Peter L. Klempay
AGENT

PATENTED MAR 28 1972 3,652,045

INVENTOR.
ANDREW J. HIRT
BY
Peter L. Klempay
AGENT

PIPE HANGER

Numerous arrangements for suspending pipes have been proposed. One of the most widely used types of pipe hangers consists of a yoke and a U-shaped saddle. The prior art hangers of this type employ a bolt for holding the yoke and saddle members together. When installing these hangers, the workmen frequently drop or loose the nut necessitating the waste of extensive time in locating the dropped nut. There is also the problem with pipe hangers of this type that the upper ends of the saddle tend to move together under load, placing substantial shearing forces along portions of the bolt. As a result, the pipe hanger is deformed and the supported pipe sags at that point. This is especially undesirable in installations when the pipe is slightly inclined as it interferes with normal drainage of the pipe. The closing together of the ends of the saddle also makes it difficult to rotate or shift the pipe without disassembling the hanger.

It is the primary object of my invention to provide an improved pipe hanger of the saddle and yoke type which may be assembled into a unit prior to installation and which does not require the use of a nut and bolt for holding the yoke and saddle members together, thereby eliminating the danger of loosing the nut. In accordance with the principles of my invention this objective is fulfilled by the provision of a novel pipe hanger in which a rod is used to secure the yoke and saddle members together and in which the rod is so formed as to be retained when the hanger is in an open state.

It is also an object of my invention to provide a pipe hanger assembly which eliminates the need for a spacer to prevent the undesired closing of the upper ends of the saddle member. This objective is accomplished in the present invention by providing lugs on the securing rod which serve to retain the upper portions of the saddle member in their vertical positions.

Another object of my invention is to provide a pipe hanger assembly which may be of lighter and more inexpensive construction than the assemblies of the prior art without sacrificing any strength. The arrangement of the present invention accomplishes this objective by assuring that the arm portions of the saddle member remain vertical and contiguous with the downwardly extending end portions of the yoke so that no excessive stresses are placed on the rod connecting these members together.

Still another object of the present invention is the provision of a saddle and yoke type pipe hanger which may be more inexpensively constructed and more rapidly installed than the hangers of the prior art. As will be seen herein, this is accomplished by the use of the novel attaching rod which eliminates the need for a separate nut and bolt and the need for a spacing rod for maintaining the arms of the saddle member in vertical relation.

A further object of the invention is the provision in a pipe hanger of means for maintaining the proper spacing of the side portions of the saddle of the hanger to prevent their closing together. The present invention fulfills this objective by the provision of a spacer rod which holds the side portions of the saddle in spaced relation.

The above and other objects and advantages of the invention will become apparent upon consideration of the following specification and the accompanying drawing wherein there is shown a preferred embodiment of the invention.

Figure 13:
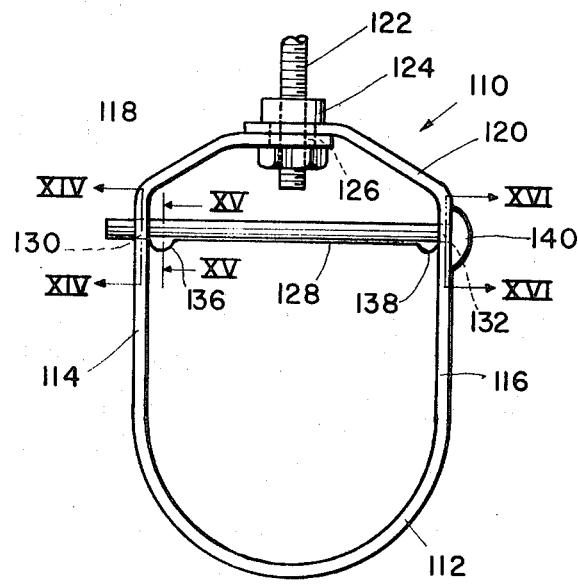
FIG. 13 is a side elevational view of a third embodiment of my invention.
Figure 14:
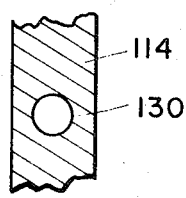
Figure 15:
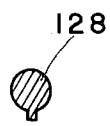
Figure 16:
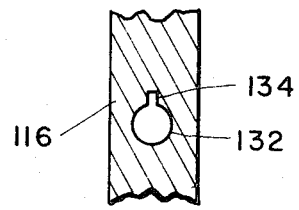

FIGS. 14—16 are fragmentary sectional views taken along the lines XIV—XIV – XVI—XVI, respectively, of FIG. 13.

Referring now to FIGS. 1 through 7, the first embodiment of my invention will be described. As will be seen from the drawing, the hanger, designated generally by the reference numeral 10, has a U-shaped saddle member 12, a yoke member 14 and a connecting rod 16. The assembly is designed to be supported by a bolt or threaded rod 18 which depends from an overhead structural member and which passes through a hole 20 in the yoke 14. Upper and lower nuts 22 and 24 serve to secure the yoke to the bolt or rod 18 and to permit vertical adjustment of the yoke. The yoke 14 has a flat horizontal center portion 26, inclined intermediate portions 28 and vertical side portions 30 and 32. The saddle member 12 consists of a semicircular middle portion 34 of a radius substantially equal to that of the pipe to be supported so that the saddle member 12 is in close fitting relation with the pipe and vertically extending straight side portions 36 and 38 which extend upwardly from the center portion 34 and are thus tangent to the pipe at opposite sides thereof.

The side portion 30 of the yoke 14 has a hole 40 with a downwardly projecting notch 42. The opposite side portion 32 also has a hole 44 and a notch 46. The similar holes 48 and 50 and notches 52 and 54 are provided in the upper ends of the side portions 36 and 38, respectively, of the saddle member 12. The notch 42 in the yoke side member 30 and the notch 52 in the side portion of the saddle 36 are each of the same depth, indicated by $x$ in FIGS. 2 and 3, respectively. The notch 54 is of a depth $y$ which is less than the dimension $x$. The notch 46 may also be of the depth $y$ but can be of a greater dimension and may, for example, be of a depth $x$ to reduce manufacturing costs of the yoke 14.

Figure 1:
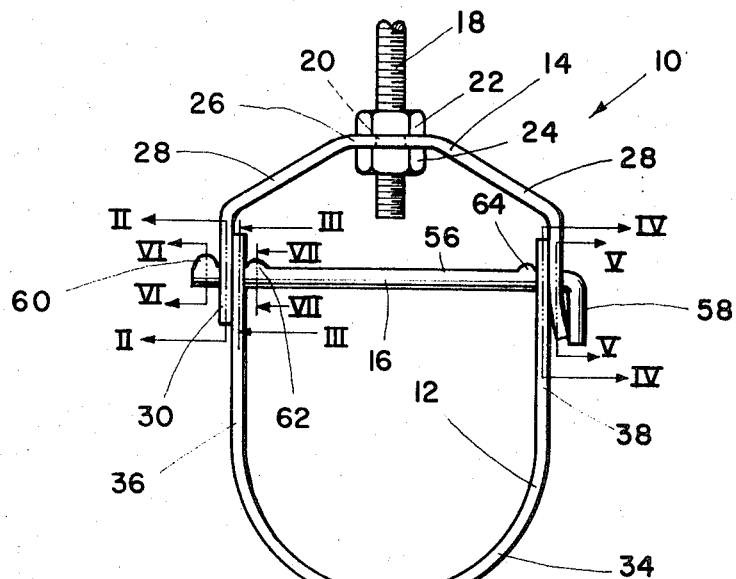
FIG. 1 is a side elevational view of a pipe hanger constructed in accordance with the principles of my invention.
Figure 2:
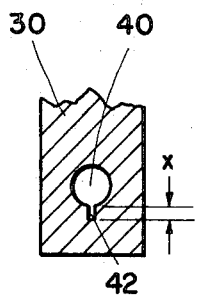
FIGS. 2-6 are fragmentary sectional views taken along the lines II—II – VI—VI, respectively, of FIG. 1.
Figure 3:
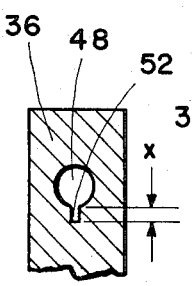
Figure 4:
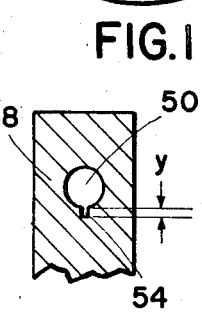
Figure 5:
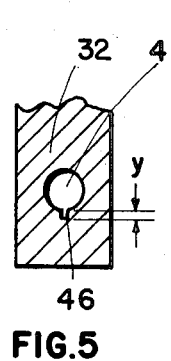
Figures 6, 7:
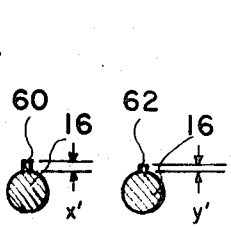
FIG. 7 is a sectional view of the rod taken along the line VII—VII of FIG. 1.
Figure 8:
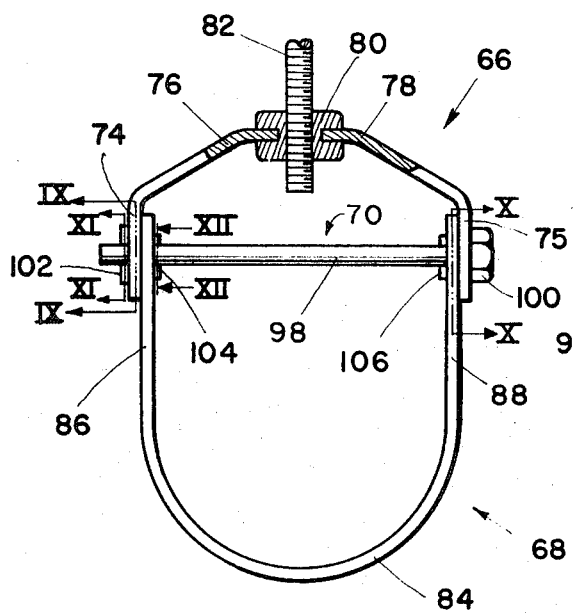
FIG. 8 is a side elevational view, partially in section, of a second embodiment of my invention.
Figures 9, 10, 11, 12:
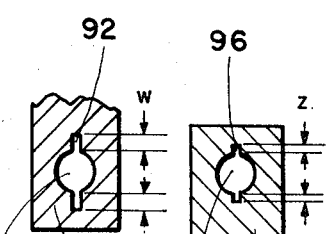
FIGS. 9 and 10 are fragmentary sectional views taken along the lines IX—IX and X—X, respectively, of FIG. 8.
FIG. 11 is an end view of the rod employed in the hanger of FIG. 8.
FIG. 12 is a sectional view of the rod taken along the line XII—XII of FIG. 8.

The connecting rod 16 has a straight portion 56 and is bent at one end, as indicated at 58, to provide a handle for turning the rod. The opposite end of the rod has a raised portion 60 which, as shown in FIG. 6, extends a distance $x'$ outwardly from the cylindrical rod. Raised portions 62 and 64 are also provided along the rod in alignment with the end raised portion 60. These projections, as shown in FIG. 7, extend the distance $y'$ from the rod. The raised portion 62 is spaced from the end raised portion 60 by a distance substantially equal to the combined thicknesses of the downwardly extending side portion 30 of the yoke and the upwardly extending side portion 36 of the saddle member. The projection 64 is spaced from the bent end portion 58 by a distance equal to substantially combined thicknesses of the side portion 32 of the yoke and the side portion 38 of the saddle. The heighth of the end projection or lug 60 is slightly less than the dimension $x$ of the slots 42 and 52 but is greater than the dimension $y$ of the slots 46 and 54. The heighth $y'$ of the lugs 62 and 64 is slightly less than the dimension $y$ of the notches 46 and 54. When the connecting rod 16 is in the position shown in FIG. 1, that is, with the lugs 60–64 projecting upwardly, the lug 60 and the downwardly bent end portion 58 of the rod serve to retain the rod between the side portion 30 and 32 of the yoke thus retaining the pipe hanger in a closed position. Obviously, other arrangements may be provided for holding the rod in position. For example, the edges of the hole 44 at opposite sides of the notch 46 may be bent outwardly to provide small tabs which engage opposite sides of the end portion 58 and hold the rod against rotation under vibration. The lower corners of the end of the yoke may also be bent outwardly to restrain the rod.

It should be noted that the lower portion of the side member 32 is bent slightly outwardly so as to press against the downwardly extending end portion 58 of the rod to slightly tension the rod thus preventing it from being vibrated out of the closed position. When the rod is rotated 180° so that the lugs 60–64 project downwardly the rod may be pulled to the right. The lugs 62 and 64 are aligned with the notches 54 and 46 and, since the dimension y' of the lugs is less than the dimension y of these notches, the lugs 62 and 64 pass through the notches 54 and 46. The lug 60 passes freely through the notches 42 and 54 since the dimension x' of the lug is less than the dimension x of the notches 42 and 52. However, since the dimension x' is greater than the dimension y the lug 60 will not pass through the notch 54. As a result, the rod may be withdrawn only until the lug 60 reaches the right side member 38 of the saddle 12 and at this point the rod is retained. It will be seen that this arrangement permits the pipe hanger to be opened so that a pipe may be positioned on or removed from the saddle 12 but the saddle 12, yoke 14, and rod 16 are retained as an assembly and are not totally separated. During assembly of the pipe hanger, the rod 16 is installed by inserting the end 58 through the hole 50' from the inside of the saddle and then through the hole 44. Since this requires manipulation of the rod 16, it is impossible for the rod to accidentally fall free of the yoke or saddle.

FIGS. 8–12 illustrate a second embodiment of the invention. In this embodiment there is provided a yoke member 66, a saddle member 68 and a connecting rod 70. The yoke has vertical side portions 74, inclined intermediate portions 76, and a horizontal center portion 80. A threaded insert 80 is retained in a hole threaded onto a depending rod or bolt 82 for supporting the hanger assembly. The saddle 68 has a semicircular bottom portion 84 and straight side portions 86 and 88. The lower ends 74 and 75 of the yoke 66 are provided with holes 90 and slots 92 extending equal distances above and below the hole 90. The slot 92 in the left side member 94 extends a distance w while the slot in the opposite side member 75 extends a distance z which is less than the distance z. The connecting rod 70 has a straight portion 98 and an end portion 100 which may be of hexagonal cross section for use with a conventional wrench.

Pins 102 are provided at the end of the rod 70 and these pins project above and below the rod by a distance z' which is less than the dimension w but greater than dimension z. As in the previous embodiment, this pin serves to retain the rod in position, the pin preventing withdrawal of the rod when turned at an angle other than the vertical and permitting the withdrawal of the rod through the left side members of the yoke and saddle when the pin 102 is vertically aligned. Pins 104 and 106 are also provided in the rod 70 and these pins are aligned with the end pin 102. The pins 104 project a distance z' above and below the rod 70 which is less than the dimension z. As in the previous embodiment, these pins are spaced from the end pin and from the head portion 100 by a distance equal to the sum of the thicknesses of the straps forming the yoke and saddle members and serve to prevent the side portions 86 and 88 of the saddle from closing toward one another under load. Preferably, the pin 102 is not installed until the rod 70 has been inserted through the holes in the right side members. After the pin 102 is installed, it is impossible to remove the rod 70 from the yoke 66 and saddle 68.

FIGS. 13–16 illustrate another embodiment of my invention. In this embodiment there is provided a pipe hanger 110 which is formed of a single length of strip. The strip has a semicircular lower portion 112 on which the pipe rests, straight parallel side portions 114 and 116, and end portions 118 and 120 which are inclined toward one another from the side portions 114 and 116 and which terminate in overlapped ends. A depending rod or bolt 122 is threaded into an insert 124 carried in holes 126 in the overlapped end portions. In order to hold the side portions 114 and 116 in spaced parallel relation there is provided a rod 128 which passes through holes 130 and 132 in the side members 114 and 116, respectively. The hole 130 may be circular, as shown in FIG. 14. The hole 132 is provided with a notch 134. The rod 128 has a pair of lugs 136 and 138 and an end 140 which may, for example, consist of a flattened or mushroomed portion of the rod. The lug 138 is of such size as to pass through the notch 134 when radially aligned therewith and to be retained when not so aligned. The lug 136 may be larger than the notch 134 so that the rod is retained in the hanger. The notches 136 and 138 and spaced apart sufficiently to hold the side portions 114 and 116 in straight parallel relation when the rod is inserted in the holes 130 and 132 and turned so that the lug 138 and notch 134 are not aligned.

It should now be apparent that I have provided a novel pipe hanger which fulfills the objectives set out above. The arrangement shown permits the preassembly of the entire pipe hanger unit and does not require the use of special tools in installing the hanger or in installing a pipe in the hanger. Since all the components of the hanger are retained as an assembly, even when the hanger is in open state, there is no danger of a part being lost or dropped and resultant saving of time and materials is realized. The provision of the inner lugs or pins which serve to restrain the side members of the saddle from moving inwardly provides a strong construction, avoiding the difficulties of excessive stresses along the bolt or rod which joins the saddle and yoke and this fact combined with the positioning of the saddle members within the side members of the yoke which transmits the stresses more efficiently, permits the use of lighter materials without any sacrifice in strength or carrying capacity of the hanger.

It will be understood that changes and/or additions may be made in and to the described embodiments of the invention without departing from the spirit thereof. Reference should therefore be had to the appended claims in determining the true scope of the invention.

I claim:

1. A pipe hanger, comprising: a yoke having a horizontal center portion and downwardly extending side portions and adapted to be vertically adjustably secured to a depending support; a saddle having a semicircular center portion and side portions extending vertically upward from the ends of said center portion, each of the side portions of said yoke and each of the side portions of said saddle having a noncircular hole extending therethrough, said holes being in horizontal alignment with one another, the holes of one of said yokes side portions and one of said saddle side portions being of identical configuration, and the holes of the others of said side portions being of identical configurations to one another and of a different configuration from said first-mentioned holes; and a rod passing through said holes, said rod having an end portion which will not pass through any of said holes when said rod is axially aligned with said holes, said rod also having a noncircular portion at the end thereof opposite said end portion, said noncircular portion passing through said first-mentioned holes only when said rod is radially aligned therewith and not passing through said last-mentioned holes.

2. The pipe hanger according to claim 1 further including additional noncircular portions on said rod, said additional noncircular portions passing through each of said holes only when radially aligned therewith said additional noncircular portions being spaced relative to one another, to said first noncircular portion and to said end portion by such distances as to hold said side portions of said saddle in parallel relation to one another and in close-fitting relation to the side members of said yoke.

3. The pipe hanger according to claim 2 wherein said first-mentioned holes consists of a circular portion and a notch of a first depth; said last-mentioned holes consisting of a circular portion and a notch of a second depth, said first depth being greater than said second depth; and said first-mentioned noncircular portion of said rod consisting of a lug extending a first heighth from said rod, said heighth being less than said first depth but greater than said second depth.

4. The pipe hanger according to claim 3 wherein said additional noncircular portions each consist of a lug extending a second heighth from said rod, said second heighth being less than said second depth.

5. The pipe hanger according to claim 4 wherein the notches of each of said holes are radially aligned with one another and where all of said lugs are radially aligned with one another.

6. The pipe hanger according to claim 1 wherein said end portion of said rod comprises a portion of said rod bent at substantially a right angle to the principle portion of said rod.

7. The pipe hanger according to claim 6 wherein the side portion of said yoke adjacent said end portion of said rod is bent slightly outward from the vertical.

8. A pipe hanger, comprising: a yoke having a horizontal center portion and downwardly extending side portions and adapted to be adjustably secured to a depending support; a saddle having a semicircular center portion and upwardly extending side portions, the ends of said side portions of said saddle being received between said side portions of said yoke, one pair of adjacent side members having aligned openings of a first configuration extending therethrough, the other pair of adjacent side members having aligned openings of a second configuration extending therethrough, all of said openings being axially aligned; and a rod extending through all of said openings and having a first end portion which does not pass through any of said openings when the principle portion of said rod is axially aligned with said openings and a second end portion passing through said openings of said first pair of side members only when said second end portion is radially aligned with said openings, said second end portion not passing through said openings in said second pair of side members.

9. The pipe hanger according to claim 8 wherein said openings of said first pair of side portions are circular holes having a notch of a first depth, said openings of said second pair of side members are circular holes having a notch of a second depth less than said first depth, and said second end portion has a lug extending from said rod by a distance less than said first depth but greater than said second depth.

10. The pipe hanger according to claim 9 further including an additional lug on said rod spaced from said first end portion a distance equal to the combined thicknesses of said side portion of said yoke and said side portion of said saddle; and a second additional lug on said rod spaced from said second end portion a distance equal to the combined thicknesses of said side portion of said yoke and said side portion of said saddle, said additional lugs passing through all of said openings only when radially aligned with the notches thereof.

11. The pipe hanger according to claim 8 wherein said openings of said first pair of side portions are circular holes having notches at diametrically opposite sides thereof of a first depth, said openings of said second pair of side members are circular holes having notches at diametrically opposite sides thereof of a second depth less than said first depth, and said second end portion has a pin extending normal to the axis of said rod and projecting on either side thereof a distance less than said first depth but greater than said second depth.

12. The pipe hanger according to claim 11 further including an additional pin extending normal to the axis of said rod and spaced from said first end portion a distance equal to the combined thicknesses of said side portion of said yoke and said side portion of said saddle; and a second additional pin extending normal to the axis of said rod and spaced from said second end portion a distance equal to the combined thicknesses of said side portion of said yoke and said side portion of said saddle, said additional pins passing through all of said openings only when radially aligned with the notches thereof.

13. In a pipe hanger having a saddle portion, side portions extending vertically upward from said saddle portion, and a yoke portion extending from said side portions and adapted to be secured to a depending member, the improvement comprising: a rod extending through horizontally aligned holes in said side portion, one of said holes being of noncircular configuration, said rod having a pair of noncircular portions passing through said noncircular holes only when radially aligned therewith, said pair of noncircular portions not passing through the other of said holes, and said noncircular portions being spaced apart by a distance substantially equal to the separation of said side portions when said portions are parallel to one another.

* * * * *